Patented June 19, 1945

2,378,717

UNITED STATES PATENT OFFICE 2,378,717

REUSE OF VULCANIZED SCRAP SYNTHETIC RUBBER

Joseph Hugh Macey, Akron, Ohio, assignor to The B. F. Goodrich Company, New York, N. Y., a corporation of New York No Drawing. Application July 15, 1942, Serial No. 451,092

14 Claims. (Cl. 260—79)

This invention relates to the reuse of vulcanized scrap synthetic rubber and to the manufacture of strong resilient synthetic rubber products containing such scrap.

It has long been known that it is possible to grind vulcanized natural rubber scrap and to use the ground scrap as a filler in the compounding of crude unvulcanized natural rubber, but, because of the fact that the ground scrap adversely affects the properties of vulcanizates containing it, this compounding method has not been widely used. Instead the industry has worked up vulcanized scrap rubber by reclaiming processes which convert the resilient vulcanized rubber to a plastic condition resembling that of crude unvulcanized rubber and permit it to be mixed with vulcanizing agents and revulcanized. Although products made from this reclaimed rubber in admixture with crude rubber are somewhat more useful than rubber products containing ground vulcanized natural rubber scrap, they still have only a fraction of the strength, resiliency and resistance to wear of rubber products which do not contain reclaimed rubber.

With the advent of synthetic rubber as a partial replacement for natural rubber it has become desirable to reuse vulcanized synthetic rubber scrap and, to this end, the art has developed methods of producing reclaimed synthetic rubber from vulcanized synthetic rubber scrap but here again it has been found that vulcanizates made from this reclaimed synthetic rubber either alone or in admixture with crude synthetic rubber are decidedly inferior in quality to those made from the original unvulcanized synthetic rubber.

In marked contrast, however, to the deleterious effects of reclaimed natural or synthetic rubber on natural or synthetic rubber vulcanizates and to the deleterious effect of ground vulcanized natural rubber scrap on natural rubber vulcanizates, I have now discovered that the addition of ground vulcanized synthetic rubber scrap to unvulcanized synthetic rubber produces a composition which, when vulcanized, is equal and in some cases even superior in properties to similar vulcanizates which do not contain the ground scrap.

This invention accordingly consists in the process of grinding vulcanized scrap synthetic rubber, mixing it with unvulcanized synthetic rubber and vulcanizing the mixture, and in the product so prepared.

The synthetic rubbers which are used in this process are more properly defined as rubbery butadiene-1,3 copolymers, that is, rubbery materials prepared by the copolymerization of butadiene-1,3 (hereinafter referred to as butadiene, its common name) with other polymerizable organic compounds such as styrene, acrylonitrile, acrylic acid, methyl acrylate, methyl methacrylate, methacrylamide, methyl vinyl ketone, isobutylene, vinylidene chloride and similar polymerizable unsaturated organic compounds which contain a carbon to carbon double bond,

present in a resinophoric group, that is, a chemical grouping in an organic compound which substantially increases the tendency of that compound to undergo linear polymerization, typical examples of such groups being groups in which the carbon to carbon double bond occurs at the end of a chain (as in a vinyl,

or vinylidene,

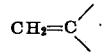

group) or is present in a conjugated system as in the structures

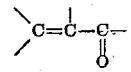

and

or both. Obviously the rubbery butadiene copolymers which will ordinarily be used are those which are commercially available in large quantities such as the rubbery copolymers of butadiene and acrylonitrile including the materials known by the trade names of "Hycar OR" (a copolymer of butadiene and a lesser amount of acrylonitrile), "Perbunan" (believed to be a copolymer of about 3 parts of butadiene and 1 part of acrylonitrile), "Chemigum" and "Thiokol RD" (both of which are believed to be copolymers of butadiene with lesser amounts of acrylonitrile), and the rubbery copolymers of butadiene and styrene such as "Buna S" or "GR-S" (copolymers of about 3 parts of butadiene and 1 part of styrene.)

Scrap vulcanizates containing such rubbery butadiene copolymers may be obtained from various sources. For example such scrap may be collected in rubber factories manufacturing synthetic rubber products or it may consist of worn-out or defective vulcanized synthetic rubber articles such as tire treads, gasoline hose, belts and the like. Obviously the vulcanized scrap will usually contain, in addition to the rubbery butadiene copolymer, the conventional pigments, fillers, softeners, etc., which were used in the compounding of the rubbery copolymer prior to vulcanization. Natural rubber and other types of so-called synthetic rubbers may also be present in the scrap vulcanizate but it is preferred that substantially all of the rubbery material present be a butadiene copolymer.

In the practice of the invention the vulcanized scrap is ground moderately fine, a material which will pass a screen having 30 meshes per inch being quite suitable, and is then mixed in any desired manner as on a mixing mill or in an internal mixer with an unvulcanized rubbery butadiene copolymer which may be the same copolymer as is present in the vulcanized scrap or some other butadiene copolymer, preferably the former. Compounding and vulcanizing ingredients such as softeners, fillers, reinforcing pigments, antioxidants, sulfur, and vulcanization accelerators are also preferably included in the composition containing the unvulcanized butadiene copolymer and the vulcanized scrap, and the composition is then vulcanized. Vulcanization may be effected by methods well-known to the art as in a heated mold, in open steam or in hot air. The temperature for vulcanization is preferably somewhat higher than that customarily used in vulcanizing natural rubber compositions, however, being in the neighborhood of 260–350° F.

The proportion of ground vulcanized scrap which is included in the unvulcanized composition may be varied widely depending on the properties desired in the finished vulcanized material. In general, it may be said that the vulcanized scrap acts as a filler without either decreasing or increasing the tensile strength of the final product. Hence amounts of vulcanized scrap as large and several times larger than the amount of the unvulcanized copolymer may be used without appreciably affecting the properties of the vulcanizates. Best results, considering both the quality of the products and the economic advantages attending the use of large quantities of vulcanized scrap, are obtained by using from 1 to 5 parts of ground scrap for each part of unvulcanized copolymer. When such quantities of ground scrap are employed it has also been found possible to reduce the amount of pigments such as carbon black and whiting which are used for a given amount of unvulcanized material without lowering the quality of the product.

As a specific example of one embodiment of the invention, a quantity of a scrap vulcanized butadiene-acrylonitrile copolymer was ground to pass a 30 mesh screen. This scrap vulcanizate had originally been prepared by vulcanizing a composition containing the following ingredients:

| | Parts by weight |
|---|---|
| Butadiene-acrylonitrile copolymer | 100.00 |
| Whiting | 50.00 |
| Carbon black | 70.00 |
| Zinc oxide | 5.00 |
| Tricresyl phosphate | 30.00 |
| Paraffin oil | 2.00 |
| Lauric acid | 1.50 |
| Sulfur | 2.00 |
| Benzo thiazyl disulfide | 1.75 |

The ground vulcanized scrap was then mixed with an unvulcanized butadiene-acrylonitrile copolymer in the following recipe:

| | Parts by weight |
|---|---|
| Unvulcanized butadiene-acrylonitrile copolymer | 100.00 |
| Ground vulcanized butadiene-acrylonitrile copolymer scrap | 400.00 |
| Carbon black | 20.00 |
| Zinc oxide | 5.00 |
| Tricresyl phosphate | 30.00 |
| Paraffin oil | 2.00 |
| Lauric acid | 1.50 |
| Sulfur | 2.00 |
| Benzo thiazyl disulfide | 1.75 |

The resulting composition was then vulcanized in a mold at a temperature of 320° F. The product was a strong resilient synthetic rubber vulcanizate possessing a tensile strength of about 2000 lbs./sq. in. and an ultimate elongation of about 400%. Vulcanizates compounded in the same recipe except that no ground scrap is included possess about the same physical properties. On the other hand, however, the incorporation of an amount of ground natural rubber scrap equal to the amount of crude natural rubber in a natural rubber composition lowers the tensile strength of the vulcanizate by about 50% while a 25% lowering of tensile strength is brought about by the addition of a similar quantity of a reclaimed butadiene-acrylonitrile copolymer to a butadiene-acrylonitrile copolymer composition.

The advantages of this invention are readily apparent since it permits the production of rubber goods at a much lower cost and with a great saving in essential rubber supplies without any decrease in quality.

I claim:

1. The process of reusing vulcanized scrap synthetic rubber comprising a vulcanizate of a copolymer of butadiene-1,3 with a lesser amount of an unsaturated organic compound selected from the class consisting of acrylonitrile and styrene, which comprises grinding said vulcanized scrap synthetic rubber, mixing it with an unvulcanized copolymer of butadiene-1,3 with a lesser amount of an unsaturated organic compound selected from the class consisting of acrylonitrile and styrene, and vulcanizing the mixture.

2. The process of reusing a vulcanizate of a copolymer of butadiene-1,3 with a lesser amount of an unsaturated organic compound selected from the class consisting of acrylonitrile and styrene, which comprises grinding said copolymer vulcanizate, mixing it with an additional amount of the same said copolymer in the unvulcanized condition, and vulcanizing the mixture.

3. The process of reusing a vulcanized scrap synthetic rubber comprising a vulcanizate of a copolymer of butadiene-1,3 with a lesser amount of an unsaturated organic compound selected from the class consisting of acrylonitrile and styrene, which comprises grinding said vulcanized scrap synthetic rubber to pass a 30 mesh screen, mixing it with an unvulcanized copolymer of butadiene-1,3 with a lesser amount of an unsaturated organic compound selected from the class consisting of acrylonitrile and styrene, and with sulfur, and vulcanizing the mixture.

4. The process of reusing a vulcanized scrap synthetic rubber comprising a vulcanizate of a copolymer of butadiene-1,3 with a lesser amount of acrylonitrile, which comprises grinding said vulcanized scrap synthetic rubber, mixing it with an unvulcanized copolymer of butadiene-1,3 with a lesser amount of an unsaturated organic compound selected from the class consisting of acrylonitrile and styrene, and vulcanizing the mixture.

5. The process of reusing a vulcanized scrap synthetic rubber comprising a vulcanizate of a copolymer of butadiene-1,3 with a lesser amount of acrylonitrile, which comprises grinding said vulcanized scrap synthetic rubber, mixing it with an unvulcanized copolymer of butadiene-1,3 with a lesser amount of acrylonitrile and vulcanizing the mixture.

6. The process of reusing a vulcanized scrap synthetic rubber comprising a vulcanizate of a copolymer of butadiene-1,3 with a lesser amount of acrylonitrile, which comprises grinding said vulcanized scrap synthetic rubber to pass a 30 mesh screen, mixing it with an unvulcanized copolymer of butadiene-1,3 with a lesser amount of acrylonitrile, in a proportion of about 1 to 5 parts of ground scrap for each part of the unvulcanized copolymer, and vulcanizing the mixture.

7. The process of reusing a vulcanized scrap synthetic rubber comprising a vulcanizate of a copolymer of butadiene-1,3 with a lesser amount of styrene, which comprises grinding said vulcanized scrap synthetic rubber, mixing it with an unvulcanized copolymer of butadiene-1,3 with a lesser amount of an unsaturated organic compound selected from the class consisting of acrylonitrile and styrene, and vulcanizing the mixture.

8. The process of reusing a vulcanized scrap synthetic rubber comprising a vulcanizate of a copolymer of butadiene-1,3 and styrene, which comprises grinding said vulcanized scrap synthetic rubber, mixing it with an unvulcanized copolymer of butadiene-1,3 with a lesser amount of styrene, and vulcanizing the mixture.

9. A strong resilient synthetic rubber product prepared by the process of claim 1.

10. A strong resilient synthetic rubber product prepared by the process of claim 2.

11. A strong resilient synthetic rubber product prepared by the process of claim 4.

12. A strong resilient synthetic rubber product prepared by the process of claim 5.

13. A strong resilient synthetic rubber product prepared by the process of claim 7.

14. A strong resilient synthetic rubber product prepared by the process of claim 8.

JOSEPH HUGH MACEY.